(12) United States Patent
Gomez

(10) Patent No.: US 11,182,278 B2
(45) Date of Patent: Nov. 23, 2021

(54) PERFORMANCE TEST USING THIRD-PARTY HARDWARE DEVICES

(71) Applicants: Atlassian Pty Ltd, Sydney (AU); Atlassian, Inc., San Francisco, CA (US)

(72) Inventor: Nancy Gomez, Santa Clara, CA (US)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 111 days.

(21) Appl. No.: 16/555,687

(22) Filed: Aug. 29, 2019

(65) Prior Publication Data

US 2021/0064516 A1     Mar. 4, 2021

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............. G06F 11/3688; G06F 11/3684; G06F 11/3692; G06F 11/3428; G06F 11/3409; G06F 11/3419; G06F 11/3423
See application file for complete search history.

(56) References Cited

U.S. PATENT DOCUMENTS

| 2010/0333072 A1* | 12/2010 | Dulip | G06F 11/3419 |
| | | | 717/128 |
| 2017/0315902 A1* | 11/2017 | Moretto | G06F 11/3692 |
| 2018/0225195 A1* | 8/2018 | Dermer | G06F 11/34 |
| 2019/0278696 A1* | 9/2019 | Bromann | H04L 43/04 |

* cited by examiner

*Primary Examiner* — Joseph D Manoskey
(74) *Attorney, Agent, or Firm* — Brownstein Hyatt Farber Schreck, LLP

(57) ABSTRACT

Computer-implemented techniques are provided for in-device real time application program performance feature testing by test devices of an independent test device system of a performance test system. The performance test system includes an access control program that limits access to certain performance data that is automatically generated by the test devices, at test. A client device communicatively coupled to the performance test system via an internetwork installs program instructions of a performance test that may be iteratively executed to test an application program under test (APUT) in a test device. Different test conditions adapted to different performance feature testing identifying result data that is processed to determine the performance feature being tested. A test result is determined based on each performance test iteration and the test result, in addition to other test data is displayed on a user interface.

18 Claims, 12 Drawing Sheets

PERFORMANCE TEST USING THIRD-PARTY HARDWARE DEVICES

TECHNICAL FIELD

One technical field of the present disclosure is in-device computer application program performance testing. Another technical field is automated testing of software applications of mobile computing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Application programs exhibit distinct performance behavior when implemented under different environments and code structure. Executing under different operating systems, with different hardware and different code structures contribute to different performance behavioral outcomes. Given the notoriety of these issues, application developers are motivated to seek performance enhancement measures, attempting to enhance user experience, to gain a competitive edge. Improving application program performance features, such as startup and installation speeds, can help achieve the desired outcomes. Not only can user experience improve, higher benchmark ratings can become a realistic side benefit.

But application performance testing, particularly when performed in-device using mobile computing devices, when the application program is executing in its natural habitat, does not always produce useful results. Restricted test parameter and performance test results coupled with rigid test conditions can work against gainful performance behavior insights by squelching opportunities for performance enhancement. For example, certain independent mobile application testing facilities may limit access to critical performance test parameters, such as start and stop times when measuring startup times, restrict ways of accessing critical performance outcomes, such as application start times, and pose challenges to effective test design by offering inadequate test design choices, for example, lack of iterative performance test measurement and monitoring opportunities.

Publicly available fee-based test services, such as the Firebase mobile test platform services from Google, offer real time and in-device application testing services but with limited utility, leaving application developers with all the stated issues, insufficient performance test programmability feature choices, opaque test parameters, and limited access to certain performance test result data.

The need therefore arises for computer-based application program performance test techniques and systems to generate reliable, convenient, and accessible test parameter data and test results and greater test design capability for better insights into application program performance behavior that can lead to enhanced application user experience.

SUMMARY

The appended claims may serve as a summary of the invention.

BRIEF DESCRIPTION OF THE DRAWINGS

In the drawings:

FIG. 4A, FIG. 4B, FIG. 4C, FIG. 4D, FIG. 4E, FIG. 4F show example displays of a set of performance test user interfaces for processing application program testing using test devices of an independent test system.

FIG. 5A shows an example display of output data generated from an iterative performance test process.

DETAILED DESCRIPTION

Figure 1:
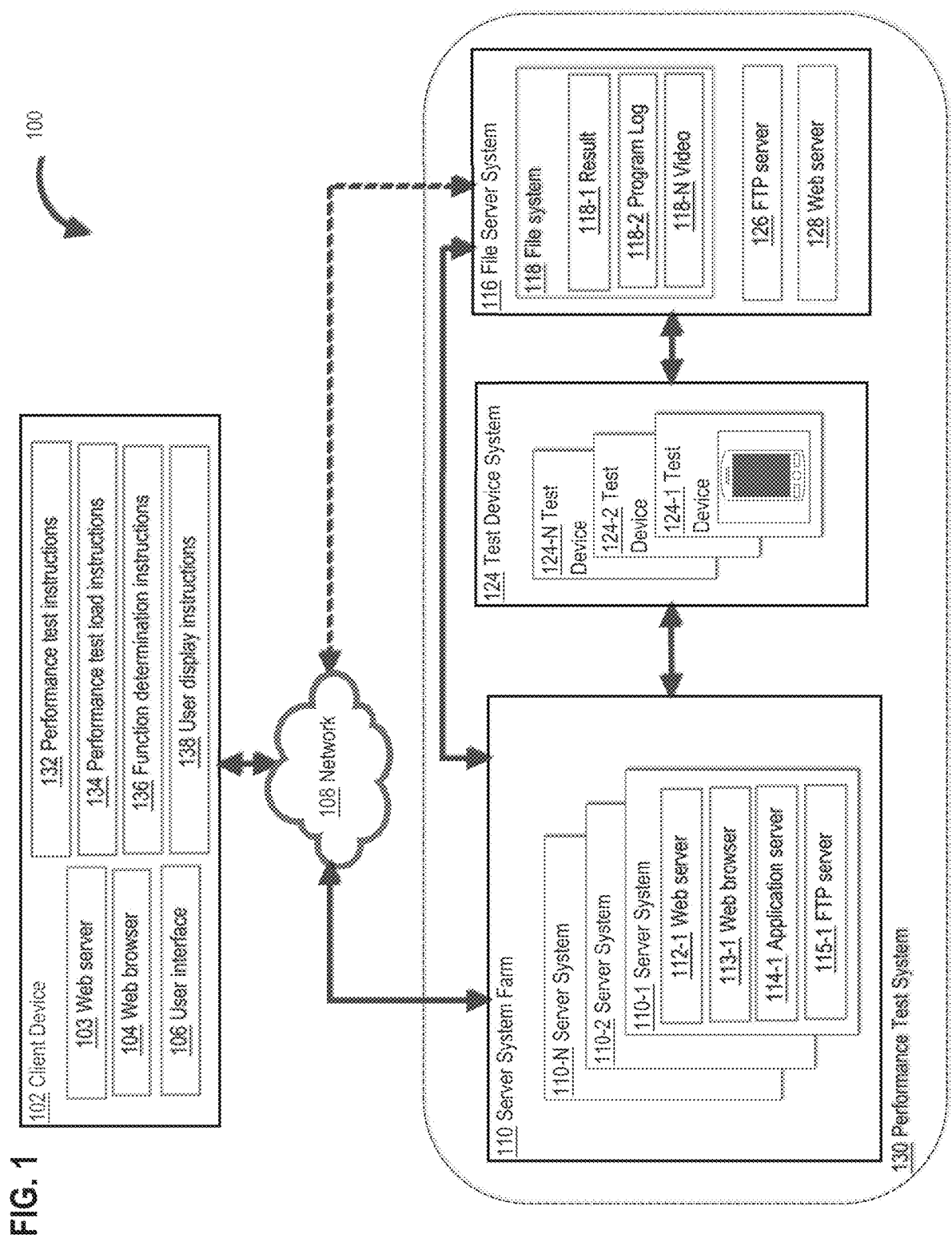
FIG. 1 illustrates functional elements of a data processing system for in-device application program performance testing, in one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:

1.0 GENERAL OVERVIEW
2.0 EXAMPLE COMPUTER SYSTEM IMPLEMENTATION
3.0 EXAMPLE FUNCTIONAL OVERVIEW
4.0 EXAMPLE FUNCTIONAL IMPLEMENTATION
5.0 EXAMPLE PERFORMANCE TEST CONFIGURATION
6.0 IMPLEMENTATION EXAMPLE—HARDWARE OVERVIEW

1.0 General Overview

In an embodiment, performance test measurements of an application program executing on a test device of an independent test device system are collected for analysis during program execution despite limited access to relevant performance test data. Typically, the test device is a mobile computing device such as a smartphone. Test measurement results are processed to analyze application performance behavior for improving application program performance test features to achieve greater user experience.

In an embodiment, a client device, coupled to a performance test system through one or more internetworks, initiates remote and controlled performance testing of an application program pre-processed, uploaded, and installed on a test device of an independent test device system of the performance test system. While hosting the application program during testing, the test device is configured or programmed to execute application program instructions and automatically generates performance test data during and after application program execution. The performance test data is collected in a locked log file during program execution. Access to the performance test data in the log file is limited by an access control program pending client device intervention to opening access to the test file and therefore test output. The performance test data includes application performance feature data for specific performance feature testing, such as application performance metric measurement describing the application program behavior during in-device performance testing. In an embodiment, the application program testing is performed in real time while the program executes on physical devices that are replicas of real-life hosts to the application program.

In an embodiment, the application program performance test is performed in one or more iterations. Multiple performance test iterations may be performed for greater performance test result reliability due to finer test granularity and possible disqualification of test result anomalies from aggregate test result processing and analysis. Performance test data is selectively generated and recorded, for example, with a programmable number of iterations and on a single or multiple iteration basis.

After completion of in-device application performance testing, server systems of the independent performance test systems can continue to provide limited exposure to certain performance result data and even restrict access to the performance test data, but certain client device methods and procedures intervene to pave the way to effective accessing and utility of performance test results.

In an embodiment, performance testing is performed by programming performance test instructions of a performance test program. A performance measurement system is configured or programmed to test an application program under test by executing application program instructions of the performance test program or by executing the application program instructions from a separate application instruction program. The performance test program may be generated by the client device and uploaded to the performance test system over the one or more internetworks.

In one embodiment, the client device may instrument the performance test program script with program instructions that when executed by one or more processors cause programming or configuration of the test devices. In an embodiment, a client device may be configured to cause a selective number of performance test iterations to be performed on the application program during a single performance test run.

Collection of performance test results may be facilitated by a file system of the performance test system that is in communicatively coupled to server systems of the performance test system for optional program data and test data storage. In an embodiment, the file system may save log files, program files, test result files in addition to other types of test files, test data, and test programs. The file system may be remote or local to the performance test system. In an embodiment, the file system may provide performance test data to the client device directly and independently of the performance test system server systems, through the same or a different internetwork system.

In an embodiment, the performance test program may include one or more performance test metrics, representing one or more performance features of the application program, are monitored in real time and under real-life and practical conditions to describe real-life application program performance behavior.

In an embodiment, during each performance test iteration, while the performance program executes, the following steps occur. Application program execution is monitored for a first test condition and when application program execution meets the first test condition, the desired performance test metric is measured at a start time. Monitoring of the application program execution continues but this time, for a second condition to be met. When the second condition is met, performance test metric measurement stops at a stop time. The second condition can be met only after the first condition is met to guard against unreliable test data. Measurement of the final performance test metric, for a single iteration, is determined based on the difference between the stop time and the start time.

In an embodiment, when the performance test iterations are completed, a test result is determined based on the measured performance test metric of at least some of the performance test iterations. While at this point, the client device has restricted access to the test result file, after performing a series of procedural steps, the client device may gain access to and process the test file data at will by electronic delivery and/or storage of the test result data.

2.0 Example Computer System Implementation

According to one embodiment, a client device initiates and causes performance testing by a performance test system that is communicatively coupled to the client device through one or more network systems to test an application program performance feature while the application program is hosted by and executing in a test device of the performance test system. The test device is one of a set of test devices that may be housed within or remotely to the performance test system. The performance test system measures one or more performance test metrics describing performance features of the application program for subsequent processing and analysis.

FIG. 1 illustrates functional elements of a performance measurement system for application program performance testing. In the example of FIG. 1, a performance measurement system 100 is organized as a distributed computer system that includes a client device 102, which is configured or programmed to direct a performance test system 130 to assess features of an application program under test (APUT) while the APUT executes on one or more test devices of a test device system 124. In an embodiment, performance measurement system 100 may be a distributed computing or networking system including one or more computing or storage devices remotely distributed relative to one another. In an embodiment, performance measurement system 100 or any components of performance measurement system 100 may be hardware, software or implemented with one or more virtual machines.

In an embodiment, client device 102 and performance test system 130 are communicatively coupled through a network system 108. In an embodiment, client device 102 may be a single unit with all components locally situated. In an embodiment, client device 102 may be a distributed computing or networking system as discussed above relative to performance measurement system 100.

In an embodiment, performance test system 130 comprises a server system farm 110, a test device system 124, and a file server system 116 that may be locally or remotely distributed relative to one another, such as in different states, countries or other geographical or political units.

In an embodiment, performance test system 130 comprises a hardware laboratory, testing facility or other computer system that is owned and operated by an entity different than a second entity that owns, operates or controls client device 102. Typically, performance test system 130 is physically separate from and remotely located with respect to client 102. The performance test system 130 is programmed with remote log-in logic to permit access by client device 102 or other computers or user accounts. The performance test system 130 may be a data center or a part of a data center or made of multiple data centers, and may include a large number of test devices, such as smartphones or other mobile computers, for third-party testing.

In an embodiment, client device 102 may be implemented in hardware, software, or as one or more virtual machines. In an embodiment, client device 102 may be configured or programmed to implement a computing device. For example, client device 102 may be desktop computer systems, portable computer systems, handheld devices, networking devices, server systems, or any other device/system that incorporates hard-wired and/or program logic to implement the techniques. Client device 102 may have memory or other data storage that is configured or programmed to host, execute or comprise a web server application 103, a web browser application 104, a user interface 106, performance test instructions 132, performance test load instructions 134, function determination instructions 136, and user display instructions 138.

In an embodiment, the client device 102 comprises executable instructions that when executed cause the client device 102 to perform the functions or operations that are described herein with reference to those modules. For example, the client device 102 comprises performance test instructions 132, performance test load instructions 134, function determination instructions 136, and user display instructions 138 that when executed cause the client device to perform the functions or operations described herein with reference to those modules. In an embodiment, client device 102 may comprise a set of memory locations (e.g. RAM) that contain instructions which when executed cause performing the performance test functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The terms "pages" or "memory location" are intended to refer broadly to any region within main memory and the specific terminology used in a system may vary depending on the memory architecture or processor architecture. In another embodiment, the performance test instructions 132 also may represent one or more files or projects of source code that are digitally stored in a mass storage device such as non-volatile RAM or disk storage, in the client device 102 or a separate repository system, which when compiled or interpreted cause generating executable instructions which when executed cause the performance management system to perform the functions or operations that are described herein with reference to those modules. In other words, the drawing figure may represent the manner in which programmers or software developers organize and arrange source code for later compilation into an executable, or interpretation into bytecode or the equivalent, for execution by the computing device 102.

Figure 2:
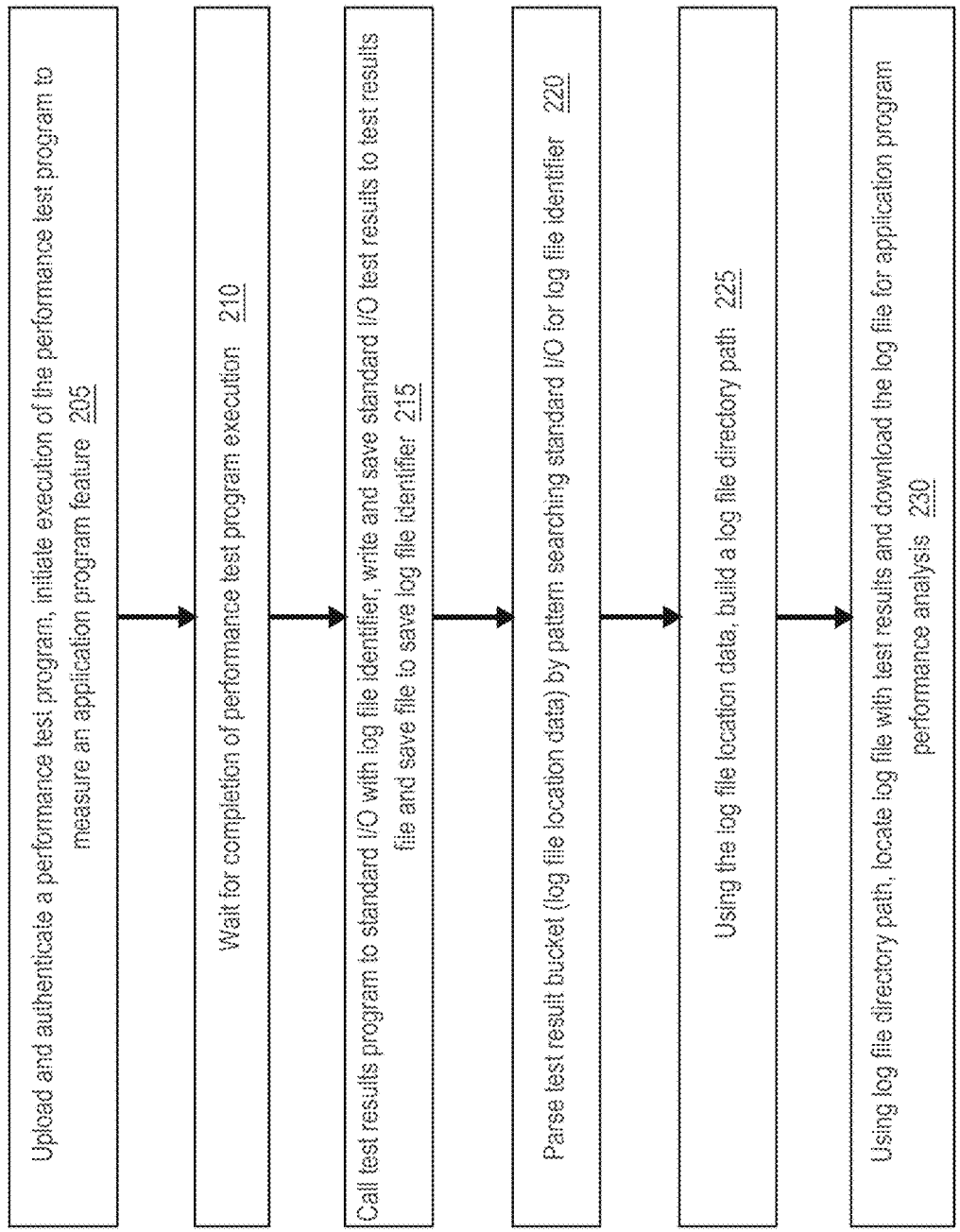
FIG. 2 illustrates an example programmable algorithm or method for performance test implementation measuring application program performance features with test devices of an independent test system, in one embodiment.

Client device 102 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 2. Client device 102 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. Further, the client device 102 and/or performance test system 130 may be implemented using two or more processors, cores, clusters, or instances of physical machines or virtual machines, configured in a discrete location or co-located with other elements in a datacenter, shared computing facility or cloud computing facility.

In an embodiment, user interface 106 may function as a presentation layer or a graphical user interface (GUI). The user interface 106, when programmed by user interface instructions 128, generates digital data representing HTML documents, vector data, or other data that can be displayed or rendered at the client device 102 or at performance test system 120 by transmission through the network system 108 to cause visually displaying data, images, text and the like representing prompts, GUI widgets, output data, reports and the like as part of the APUT performance test.

In an embodiment, user display instructions 138 are program instructions which when executed by one or more client device 102 processors can configure or program user interface 106 to perform user interface related tasks. For example, user display instructions 138, when executed, may cause the user interface application to render performance test results, such as performance test metric data and other application program data of interest, on a client device 102 display.

In an embodiment, client device 102 may comprise programmed instructions that implement Application Program Interface (API) defining program functions that client device 102 may call to test various performance features of an APUT for performance analysis, processing, and aggregation. For example, performance test instructions 132 may be programmed instructions that implement a performance test API with test functions that when called by client device 102, analyze test features and parameters of an APUT. In an example embodiment, performance test instructions 132 include APUT program instructions. In an embodiment, APUT instructions are separately maintained.

In an embodiment, a test API, implemented by performance test instructions 132, may be a representational state transfer (REST) API integrated with an HTTP server so that RESTful API calls can be issued in parameterized URLs over HTTP from the client device 102 to the test API.

In an embodiment, performance test program may include the APUT performance program and when executed by performance test system 130, execution of the program instructions of the APUT program cause an independent test site facility to generate performance test data representing application program performance features for analysis by client device 102. For example, the test site may generate performance test metric data that is collected in the log file with one or more performance test iteration runs on an in-device APUT. In an embodiment, performance test metric data may be an arithmetic average data, standard deviation data, error data, a combination thereof, or other arithmetical or statistical data or data representation.

In an embodiment, function determination instructions 136 are programmed to execute a performance test function. For example, function determination instructions may program or configure a specialized processor of client device 102 to performance test function to execute the performance test function using an arithmetic average, standard deviation, error, a combination thereof, or other arithmetic or statistical function.

In an embodiment, web browser application 104 may be configured or programmed to perform user guided or automatic web browsing functions. Web browser application 104 may cause display of a performance test system web browser for user viewing and input. In an example, web browser application 104, when configured or programmed with web browser instructions, facilitates client device 102 in performing web browsing functions. In an embodiment, client device 102 is caused to visit a user selected performance test system web site for user performance test script entry, user log file selection, performance test metric access, user performance test control selection, performance test result viewing, and other web related functions.

In an example embodiment, web browser application 104 implements an HTML browser. Commercial examples include Firefox, Chrome, Safari, Internet Explorer, and Opera. Broadly, web browser application 104 may communicate with web servers, such as remote web servers 112, 128 running on server system farm 110 and file server system 116, respectively, over the network system 108 via general world-wide-web protocols such as HTTP or HTTPS. Conversely, remote web browser applications, such as web server applications 112, 128 may communicate with web server application 103 running on client device 102 over the network system 108 via HTTP or HTTPS.

In an embodiment, file system 118 may be maintained as any type of data store such as a file repository, a volatile or non-volatile, or a combination storage system, an SQL (Structured Query Language) database management system, a non-SQL database management system or any other database management system.

Network system 108 broadly represents internetworks of a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network. In an embodiment, network system 108 may include one or more internetworks.

The performance test system 130 may be configured or programmed to perform performance testing of a APUT in one or more test iterations and during each iteration, monitors execution of APUT program instructions of a APUT on a test device for a first test condition; in response to meeting the first test condition, starts measuring a performance test metric as the test device executes the APUT program instructions; monitors execution of APUT program instructions for a second test condition; in response to meeting the second test condition, stops measuring the performance test metric; determines a measured performance test metric based on a difference between a stopping measuring time and a starting measuring time, the stopping measuring time corresponding to the stopping measuring the performance test metric and the starting measuring time corresponding to the starting measuring the performance test metric; upon completion of the test iterations, determines a test result based on the measured performance test metric of at least some of the performance test iterations and returns the test result for access to the measured performance test metric by client device 102.

In an embodiment, performance test system 130 is a computing system comprising a server system farm 110, a test device system 124, and a file server system 116. Server system farm 110 comprises one or more server systems 110-1, 110-N. Any number of server systems 110-1, 110-N may be deployed in a computing system of this type, as indicated by the designation "N" in 110-N. Server systems 110-1, 110-N may be in different locations such as different states, countries or other geographical or political units.

In an embodiment, at least one of the server systems 110-1, 110-N comprises, hosts, configures, programs, or implements one or more web server applications 112-1, 112-N, one or more application server applications 114-1, 114-N, one or more web browser applications 113-1, 113-N, and a file transfer protocol (FTP) server 115-1, 115-N. In an embodiment, client device 102 establishes a connection with server systems 110-1, 110-N using one or more protocols to exchange test-related data or test-related program data for processing by the other. One technique to transmit data is for client device 102 to upload a file containing test and program data to server systems 110-1, 110-N. Web server application 103 of client device 102 and web server application 112 of server system 110 may be programmed to facilitate file transfers between client device 102 and server system 110. Similarly, one technique to receive data is for server systems 110, 110-N to upload a file to client device 102. For example, client device 102 may program a FTP server application (not shown) to transmit one or more files over FTP/SFTP protocol to FTP server applications 115-1, 115-N and server systems 110-1, 110-N may program one or more FTP server applications 115-1, 115-N to transmit one or more files over FTP/SFTP protocol to client device 102. In an example, upon receipt of the file, FTP server applications 115-1, 115-N of corresponding server systems 110-1, 110-N may be programmed to facilitate file transfer to file server system 116 for storage through file server application 126.

In another embodiment, server systems 110-1, 110-N may expose one or more of its directories through a network file system, such as an NFS/CIFS. Client device 102 may mount the network directory using respective data originating from client device 102 and transfer a data file into the mounted directory. The transfer would trigger transmission of a copy of the data file over network system 108 to the mounted directory of server systems 110-1, 110-N. Server systems 110-1, 110-N process the data of the file and may store the data in a data repository.

In an embodiment, client device 102 transmits data in files using HTTP(s) (Hyper-Text Transfer Protocol) to application servers 114-1, 114-N. Upon the receipt, application servers 114-1, 114-N may process and store data of the file in a data repository. Similarly, in an embodiment, application servers 114-1, 114-N transmit data in files using HTTP to client device 102. Upon the receipt, client device 102 may process and store data of the file in a data repository.

In an embodiment, test device system 124 is communicatively coupled to server system farm 110 and file server system 116. Test device system 124 may be an independent test device system, site, or facility. For example, test device system 124 may include physical test devices, such as Apple iPhones and Samsung Galaxy products, and one or more processors for running tests on APUTs when the APUTs are installed onto the test devices. In an embodiment, test device system 124 is communicatively coupled to either the server system farm 110, network system 108, or both.

In an embodiment, test device system 124 is a computing system comprising one or more test devices 124-1, 124-N. Any number of test devices 124-1, 124-N may be deployed in a computing system of this type, as indicated by the designation "N" in 124-N. Test device system 124-1, 124-N may be in different locations such as different states, countries or other geographical or political units.

In an embodiment, test device system 124 is a test platform for APUTs, configured or programmed to implement performance tests on application programs to measure application program performance features for monitoring, processing, measuring, aggregation, or a combination thereof. In an example, one of more test devices 124-1, 124-N may be programmed or configured to measure performance test metrics of an in-device APUT and report measured test results in the form of raw data or processed file for storage into file server system 116 and processing by server system 110, storage and processing by server system 110, or a combination thereof.

In an embodiment, test device system 124 implements tests in real time and under real test environments. For example, test device system 124 may perform real time testing of application programs running on iOS- or Android-based machines. In this connection, one or more test devices 124-1, 124-N may be a mobile electronic device, such as an Apple iPhone or a Samsung Galaxy product. In an embodiment, a performance test script may be executed by test device system 124. For example, a performance test script measuring an application startup time may be implemented on one or more test devices 124-1, 124-N.

Performance test system 130 may include a file server system comprising a computing system with data and program file store capability. In an embodiment, file server system 116 comprises a file system 118, FTP server application 126, and web server application 128. File system 118 is a data repository that may store one or more test program files, test data files, or a combination of each in store locations 118-1, 118-N. Any number of store locations 118-1, 118-N may be deployed in a file store system of this type, as indicated by the designation "N" in 118-N. Store locations 118-1, 118-N may be in different physical locations such as different states, countries or other geographical or political units. File system 118 may be configured or programmed to store different types of test data in different storage locations. For example, file system 118 may be configured or programmed to store log files with performance test results in result storage location 118-1, crash logs in program log storage location 118-2, and media files in video storage location 118-N.

File server system 116 is directly, indirectly, communicatively coupled to server system farm 130. File server system 116 may transfer data (from data or program files) directly to server system farm 130, through the network system 108. In an embodiment, client device 102 may be configured to receive and transmit data to file server system 116, directly through network system 108. File server system 116 and server system farm 130 may be directly in communication to directly exchange test data and test program data. File server system 116 may be communicatively coupled to transmit test data to test device system 124 and may be communicatively coupled to receive test data from test device system 124. File server system 116 may serve as a data repository for server system farm 130 and test device system 124. For example, performance test data, automatically generated by test devices 124-1, 124-N, may be transmitted by server systems 110-1, 110-N and test devices 124-1, 124-N for storage into one or more file stores 118-1, 118-N. Similarly, performance test system 130 and test device system 124 may store performance test programs and APUTs in file stores 118-1, 118-N. In an embodiment, performance test system 130 and test device system 124 employ file server system as a partial file store. For example, data sets may be stored in a combination of file stores 118-1, 118-N and local file stores in or accessible to performance system farm 130 and test device system 124.

In an embodiment, FTP server application 126 may be programmed as discussed relative to FTP server applications 115-1, 115-N and web server application 128 may be programmed as discussed relative to web server applications 113-1, 113-N.

3.0 Example Functional Overview

FIG. 2 illustrates an example programmed algorithm or method for performing performance testing of an in-device APUT, in one embodiment.

Although the steps in FIG. 2 are shown in an order, the steps of FIG. 2 may be performed in any order and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In an embodiment, the client device may be configured to instrument a performance test program with specific configuration parameters or settings to optimize application program performance test reliability. Such specific configuration parameters are discussed in the section entitled "EXAMPLE PERFORMANCE TEST CONFIGURATION".

In step 205, a performance test program is uploaded to a test platform and authenticated for testing services. For example, performance testing authentication may require AWS CI-configuration authentication. In an embodiment, the performance test program includes at least one APUT test program. In an embodiment, the APUT test program is separate from the performance test program and may be provided by a performance test system or uploaded by a client device. In an embodiment, the performance test program is loaded by communicating with an access control program that mediates access to devices under test; an example access control program is the API and interface software provided by GOOGLE for its FIREBASE test service.

In an embodiment, performance test program instructions include APUT program instructions. For example, client device 102 (FIG. 1) may be configured or programmed to upload a particular performance test program with APUT program instructions to performance test system 130 to test the APUT on a test device. In an embodiment, client device 102 may be configured or programmed to upload the APUT program instructions separately from uploading the performance test program instructions. In an embodiment, client device 102 user interacts with the performance test system 130 to set various test parameters and conditions through web browser application 113.

In an example embodiment, the particular performance test program can be executed by programming performance test instructions 132 (in FIG. 1). In an embodiment, the particular performance test program may be pre-processed and authenticated as a condition to starting APUT testing. In an embodiment, pre-processing, performance testing, or a combination are performed under the direction of client device 102. In an embodiment, the particular performance test may be authenticated by performance test system 130 or a test platform service.

After a wait period for completion of the performance test at step 210, client device 102 may desire access to a log file with performance result data but client device 102 may have restricted access at this time until client device performs certain steps to unlock the location of the log file. Client device 102 has limited access to the log file because the performance test results may not be made readily available to client device 102. For example, a test platform, such as performance test system 130 may only provide test results on standard input/output to a client device user.

In an embodiment, to access the log file, at step 215, client device 102 may call a test result program, write and save the standard output into a test results file to preserve a log file identifier provided by the performance test system 130 on the standard output interface, for subsequent processing to identify the location of the log file. In an embodiment, client device 102 may unlock access to the log file by parsing the log file in step 220. In an embodiment, client device 102 may perform log file parsing by pattern searching standard input/output for a match with the saved log file identifier. The search returns a log file location when a match is determined and the log file location may be processed by client device 102 to build the directory path pointing to the log file location, at step 225. In an embodiment, parsing the log file may be achieved by searching for a particular log file identifier. In an embodiment, the log file identifier may be obtained and provided by a user account after review of GUI output.

An example log file is "syslog.txt," discussed below relative to FIGS. 4A-4F. An example log file identifier is a text string, character string, or any combination thereof. The log file identifier need not be a different string, or need not be a string, and instead may be of a different identification format. In an embodiment, the log file identifier uniquely identifies the log file name or identification each time the performance test is run on a test device.

In an embodiment, the log file is made available for access after completion of the particular performance test. In an embodiment, the log file is made available for access as the particular performance test is executed on a test device.

Next, in step 225, using the log file location data of step 220, client device 102 builds log file identifier pointing to the location of the log file. In an embodiment, log file location identifier is a log file directory path. In an embodiment, log file location identifier may point to a storage location within performance test system 130 or file server system 116, whichever may be holding the particular performance test at the time.

At step 230, client device 102 may be configured or programmed to use the log file location identifier, built in step 225, to access the log file and its contents for downloading and processing.

4.0 Example Functional Implementation

Figure 3:
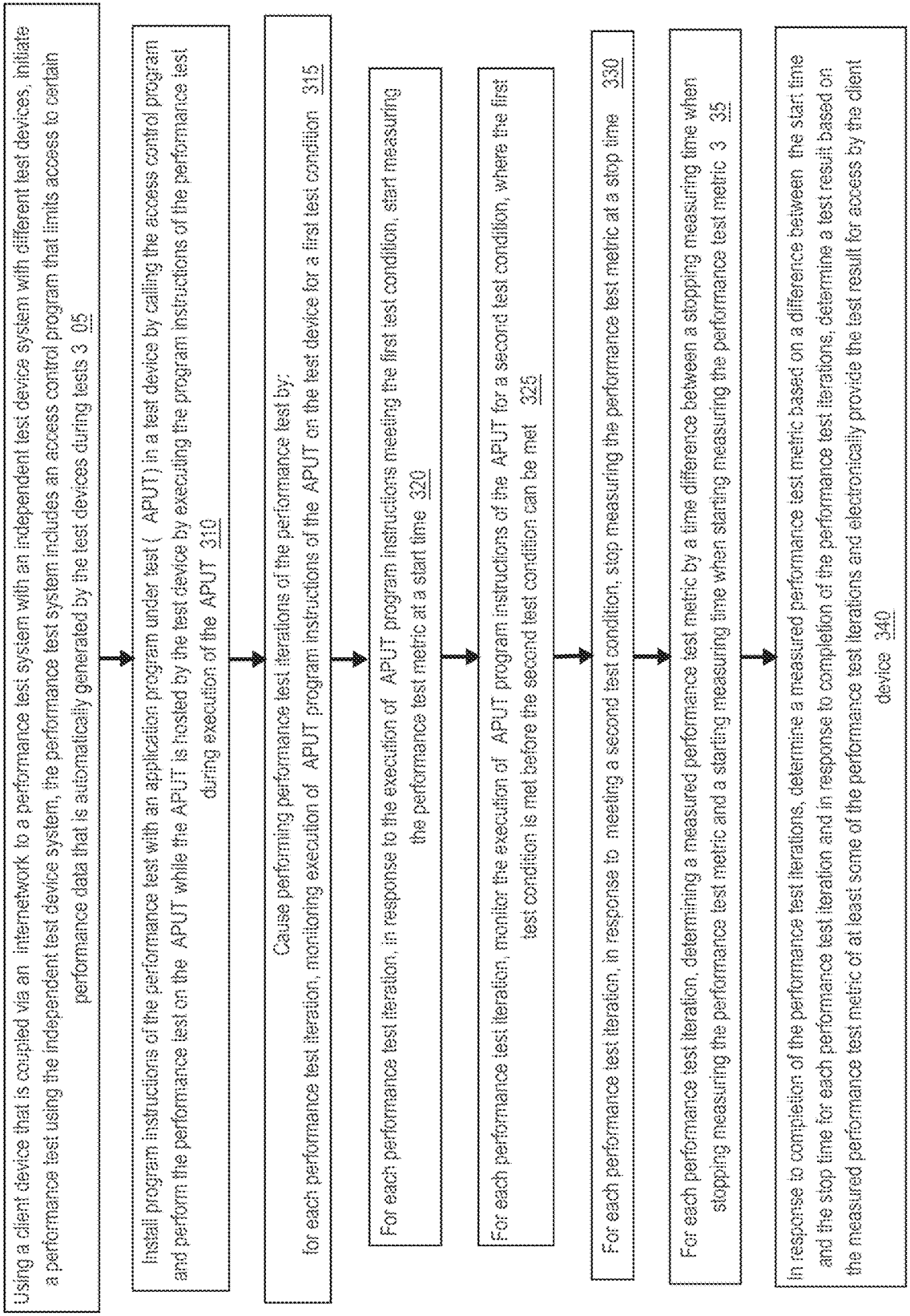
FIG. 3 illustrates an example programmable algorithm or method for performing an application program performance test with test devices of an independent test system, in one embodiment.

FIG. 3 illustrates an example programmable algorithm or method for APUT performance testing. Although the steps in FIG. 3 are shown in an order, the steps of FIG. 3 may be performed in any order and are not limited to the order shown in FIG. 3. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In an embodiment, in step 305, a client device initiates performance testing using an offsite and independent test device system, but the client device is initially provided with limited access to certain performance data automatically generated by one or more test devices of the independent test device system during test. For example, client device 102 may initiate a performance test of an APUT using performance test system 130 by uploading performance test instructions 132 to application server 114 over network system 108. In an embodiment, application program instructions of an APUT are uploaded with the performance test program instructions upload. An access code program restricts access client device 102 to certain performance data output from one or more test devices 124-1, 124-N. Performance test data may include a performance test metric that when measured provides insight into an APUT performance feature when the APUT is executed on the test devices 124-1, 124-N. In an embodiment, client device 102 must unlock a log file generated during the performance test before accessing the performance test result, as discussed relative to FIG. 2.

Next, in step 310 (FIG. 3), the APUT program instructions provided by client device 102 are installed in one or more test devices 124-1, 124-N. In an embodiment, a client device installs performance test program instructions onto test devices by calling an API of an access control program to obtain a selection of a particular test device, to provide the instructions and receive confirmation of installation. The access control program may be implemented as part of application server 114-1 to serve as an interface, which is callable from client device 102, to install programs in test devices 124-N, 124-2, 124-1. Alternatively, the access control program may be implemented within test device system 124 or application server 114-1. The particular location is not critical provided that client device 102 can obtain and access a public API for the purpose of installing software to be tested on one of the test devices.

In an embodiment, the performance test is performed on the APUT while the APUT is hosted by one or more test devices by executing the performance test program instructions 132 (FIG. 1).

In step 315, in an embodiment, performance testing requires execution of the APUT program instructions to meet one or more conditions. In an embodiment, other test parameters and functions or different numbers of test steps and parameters may define a performance test. For example, in step 315, APUT program instructions are executed on a test device to monitor for a first of two test conditions. In an embodiment, conditions may be actions or events that are caused by execution of the APUT program instructions. In an embodiment, conditions may be based on other types of test attributes. Example conditions are execution of a particular or a particular type of APUT program instruction or occurrence of a particular action, such as a particular memory allocation action or APUT performing a first rendering action, both caused by APUT program instruction execution.

In step 320, after the first condition is met, performance test metric measurement begins at a start time. Performance test metric is a measure of a performance feature of APUT under test. In an example performance test measuring an application program startup time, a first condition may be met when the test device executes an initial program instruction of the APUT program instructions. An initial program instruction is the first instruction the test device executes after the APUT program instructions are installed onto the test device.

In an embodiment, one or more iterations of the performance test are run for greater test result accuracy and reliability. In an embodiment, the number of iterations may be programmable feature of the performance test. In an embodiment where multiple performance test iterations are performed, steps 315 through 335 are performed before the next performance test iteration begins. In an embodiment, performance testing may be performed by running the test every multiple iteration with a wait delay between missed iterations.

In step 325, after meeting the first condition, while execution of APUT program instructions continue, the test device monitors the APUT program instructions for a second test condition. In the example of testing startup time or measuring for other performance features, the prior test conditions, such as the first test condition, must be met before the next, in this example, the second, test condition can be met. Following the startup time measurement example, an example of the second test condition is APUT existence on the test device. For example, a first rendering that is caused by APUT program instruction execution may be monitored searching for the first visual rendering on the client device 102 display. Measuring startup time in this manner may be done to assess user experience. Users of program applications typically judge application performance based on the first rendering they detect on the screen of the user iPhone, for example.

In step 330, in response to meeting a second test condition, measurement of the performance test metric stops at a stop time. At step 335, continuing with the above startup time example, the performance test metric measurement is determined based on the difference between the start time and the stop time for each performance test iteration.

In an embodiment, after completion of step 335, the performance test may be reset or restarted to execute the next performance test iteration and in the absence of additional iterations, continues to step 340.

At step 340, when all performance test iterations are done, the measured performance test metric may be processed or analyzed. For example, a test result may be determined based on the measured performance test metric of at least some of the performance test iterations and electronically provided in a log file for access by the client device.

In an embodiment, selective test results, test parameters and settings may be rendered on a client device user interface. For example, the test result of step 340 and each iteration performance test measurement, in addition to other test-related data, such as start and stop times for each iteration may be displayed on the client device 102 by programming the user display instructions 138 (FIG. 1) to render the data on a display by calling user interface 106 functions.

5.0 Example Performance Test Configuration

For greater performance test reliability, test device systems may be configured using specific settings or parameters. The following embodiments may provide a detailed configuration for a specific test platform. Other test platforms or facilities may be employed.

FIG. 4A, FIG. 4B, FIG. 4C, FIG. 4D, FIG. 4E, FIG. 4F show example displays of test user interfaces carrying out a procedure to perform performance testing. For example, test programs and test data may be conveniently edited, uploaded, and processed with the example user interfaces of FIG. 4A-FIG. 4F. In an embodiment, different user interfaces may be employed.

In an embodiment, FIG. 4A, FIG. 4B, FIG. 4C, FIG. 4D, FIG. 4E, FIG. 4F illustrate example displays of user interfaces of an example test platform. For purposes of illustrating a clear example, the drawing figures show interfaces and output of the FIREBASE service of GOOGLE, and in particular, user interfaces of a mobile application platform of Firebase Test Lab, MobileKit for performance testing features of an APUT during regular APUT operation, in real time, on one or more physical test devices located at Google data centers. Other embodiments may use different test lab setups.

Firebase Test Lab is a cloud-based application testing infrastructure that supports Android and iOS application across a wide variety of various devices and device configurations, such as server farms and test device systems. Test results are provided in various formats including logs, videos, and screenshots and in various files in the Firebase dashboard. Firebase uses production-level physical devices executing at a Google data center to test applications in-device. Tests are assigned to Google cloud buckets test result viewing and processing. For example, performance test scripts can be displayed for viewing and editing and test data results can be viewed for processing, in addition to other test measurement views and user interface interactions. Further information about Firebase is available in the page "testlab#key_capabilities" in the folder "docs" of the sub domain "firebase" of the second-level domain "google" of the top-level domain "com," via a web browser using HTTPS.

FIG. 4A shows an example display of an APUT performance test program, "testMeasureStartupTime_performance", a performance test script, specifically devised to test startup times of an iOS-based mobile application while the APUT is operated by one or more iPhones. The performance test program is held in a Google Cloud Bucket location uniquely assigned to the performance test program.

In this particular example, the display shows performance result data for 25 performance test iterations with each iteration generating distinct measured performance test metric data. Measured performance test metric data from one, some, or all iterations may be aggregated for further arithmetic and/or statistical function determination. In an example, the client device may be configured to execute the function determination instructions 136 (FIG. 1), to determine an average startup time, standard deviation and error measurements. In an embodiment, other arithmetic determinations may be made. In an embodiment, performance features, other than application startup times, may be tested. For example, application installation time may be measured, tested, aggregated, and processed. Client device 102 may be configured to measure application installation times from the time the program is loaded into a test device until the first observed rendering on a user interface, for example. Other criteria may be employed to measure installation times or other performance features.

In the example embodiment, a tolerance level value (or range of values) may be threshold determinative for disqualifying one-off performance test metrics from performance test metric average calculations or other aggregated data processing for reliability optimization. For example, performance test measurement data of performance test iterations with a value that exceeds a tolerance level value or a tolerance level range may disqualify the performance test measurement data from participating in aggregated test data calculations and test data processing such as function determination. An application of the tolerance value is to standard deviation measurements. Performance test metrics of iterations with standard deviations higher than the tolerance value, may be candidates for removal. Standard deviation may be determined based on an average of performance test metrics of all or some of the iterations, for example. For further clarification, test result anomaly examples are provided with reference to FIG. 5B. In an embodiment, different test data elimination algorithms, processes and procedures may be employed. In an embodiment, client device 102 may be configured to store a tolerance level or tolerance level range in file system 118 (FIG. 1).

Figure 4B:
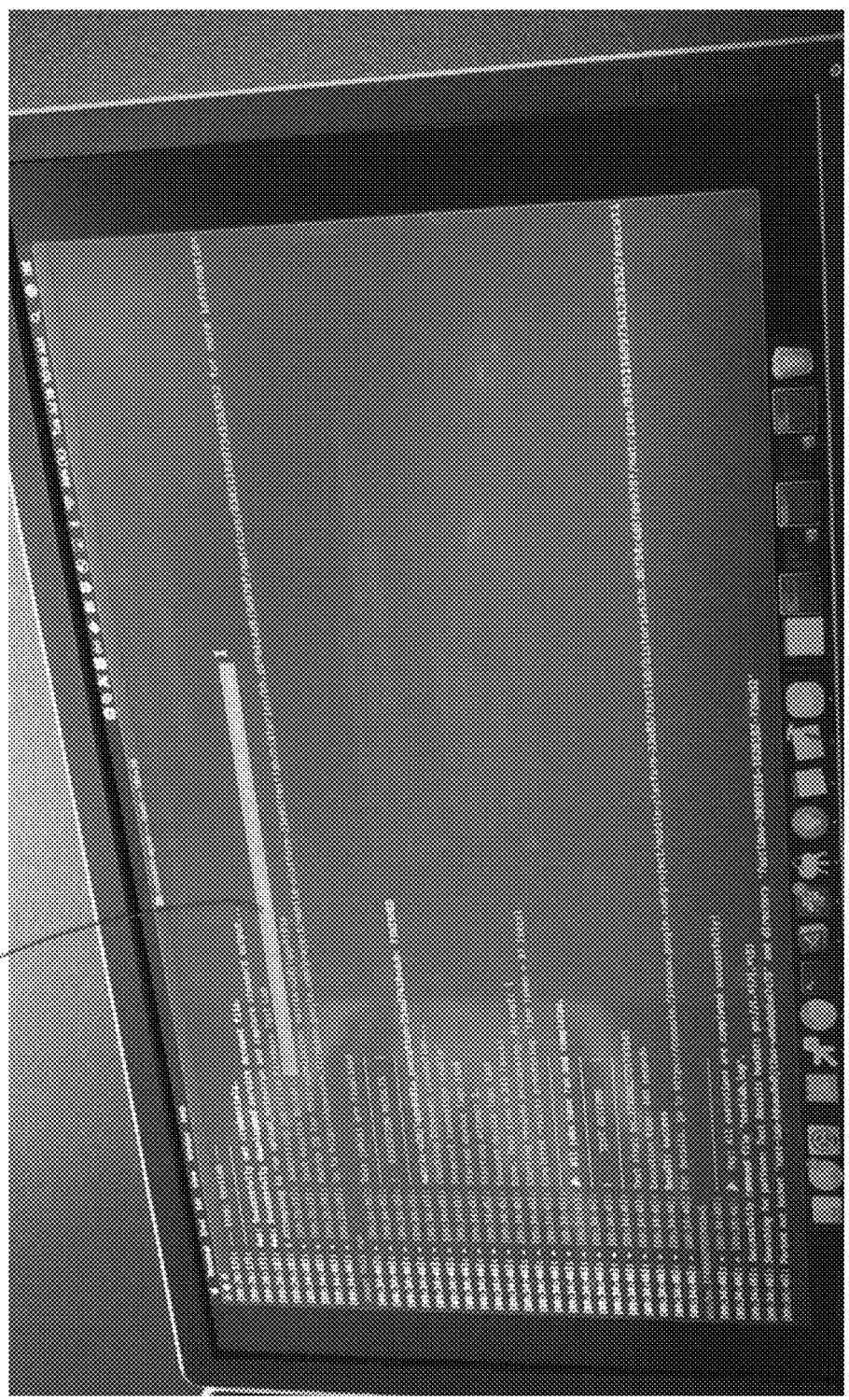

FIG. 4B is an example display of a Firebase Test Lab console. Specifically, Firebase Test Lab runs XCTest on performance test script "testMeasureStartupTime_performance". XCTest is specifically devised for iOS mobile testing. Android-based mobile products may be tested on a similar Google test platform but Espresso and UI Automator.

In an embodiment, "testMeasureStartupTime_performance" is instrumented by a client device 102 user and uploaded to performance test system 130 by client device 102. In an embodiment, "testMeasureStartupTime_performance" may be scripted by a performance test system 130 user and stored in file system 118 (FIG. 1). In an embodiment, "testMeasureStartupTime_performance" is automatically generated, for example, by use of a machine learning component. In various user interface display examples, performance or results data are placed in a (virtual) Google Cloud (GCloud) Bucket. A log file is ultimately unlocked and downloaded by client device 102, as shown in FIG. 4E. Google Cloud Bucket enables in-device mobile application testing on a per test, per device basis. Alternatively, performance testing may be performed by executing multiple tests in parallel, on multiple test devices, or a combination thereof.

In an embodiment, a performance test is pre-processed prior to start of performance test execution for authentication. An account-based AWS authentication allows CI collaboration of program and test data. Performance testing may be prohibited in the absence of successful authentication.

In FIG. 4B, the system displays a log file identifier pattern at 402 along with other test results output and test parameters and test status. The log file identifier uniquely identifies the log file generated during performance testing by the test device. In an embodiment, the results test file may be called by client device 102 but results test data of results test file is not readily made available to client device 102. Client device 102 must therefore devices methods, processes, procedures and algorithms for uncovering the storage location (within test results bucket) to gain access to the log file and its contents.

In an embodiment, client device 102 may write and save the test results after calling the test results file to preserve the log file identifier pattern for access to the log file. In an embodiment, client device 102 deletes the test results data originating from GCloud after saving the log file identifier in a results file.

Figure 4C:
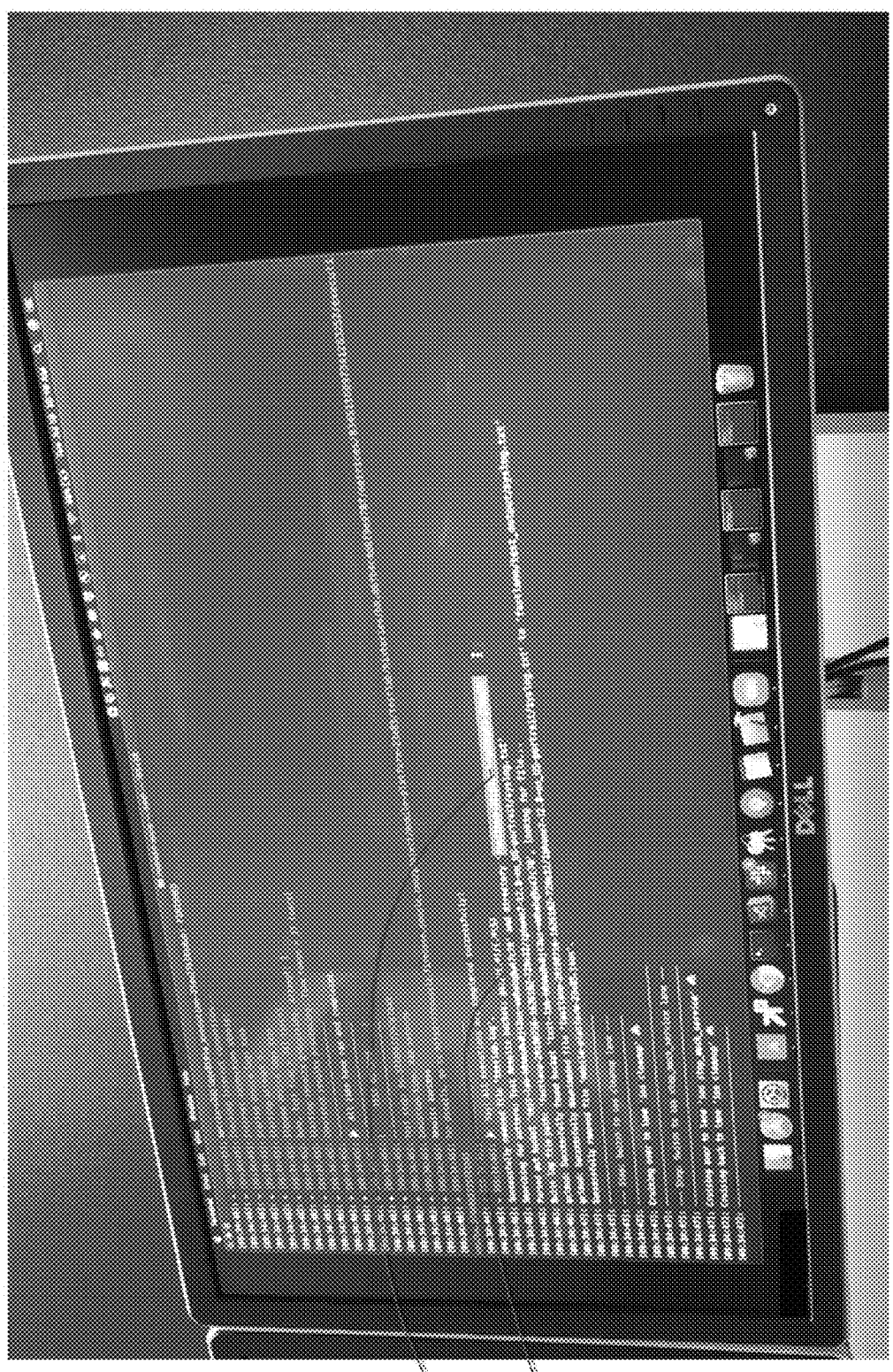

FIG. 4C shows an example display for performing parsing to access the log file. Client device 102 may perform a pattern search for the stored log file in test results bucket. A determined match reveals log file location data, or "parsed out bucket directory" 406. For example, client device 102 may perform a pattern search of test results bucket pattern 404 for the pattern referenced at 406. When a match is determined, client device 102 can build a log file directory path using the log file location pattern at 406, as shown in FIG. 4D.

Figure 4D:
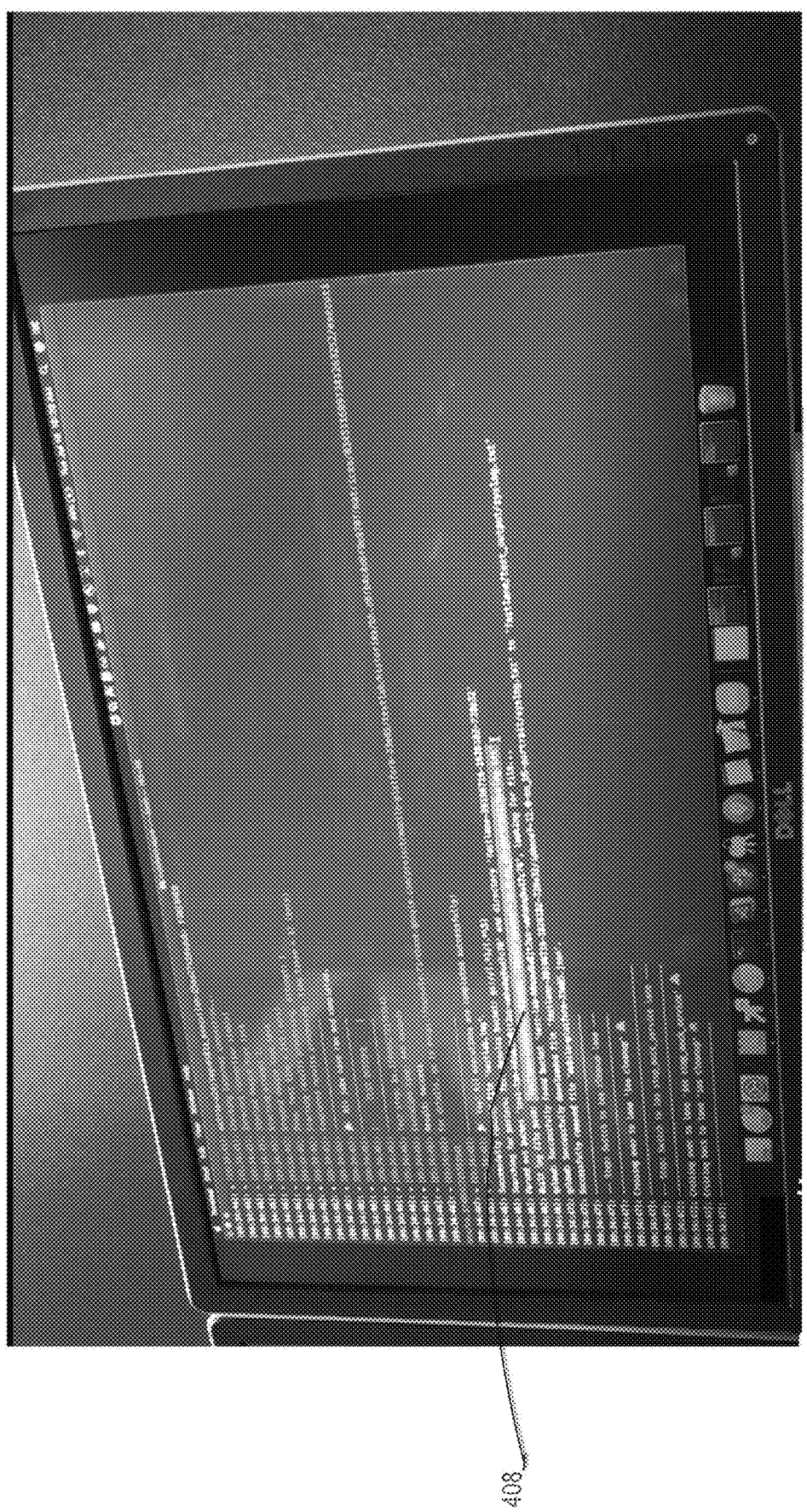
Figure 4E:
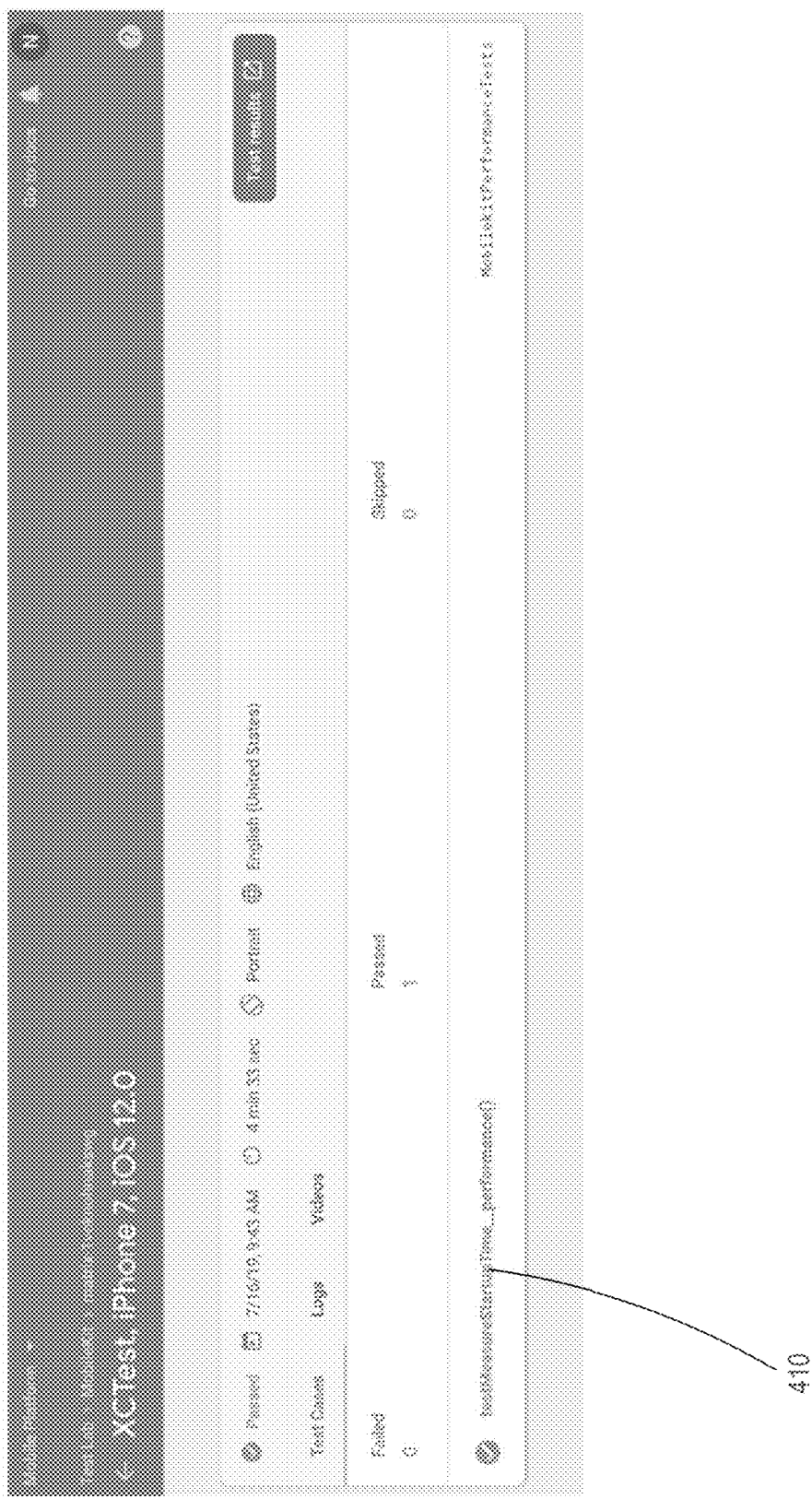

FIG. 4D shows an example display of a built log file path, at 408, that points to the location of the log file. Client device 102 may access, retrieve, and download the log file using the path, identified at 408, and now has full and convenient access to performance test feature metrics for further test processing and analysis.

FIG. 4E shows an example display of an XCTest console with a hyperlink 410 to the performance test of the example of FIG. 4A, FIG. 4B, FIG. 4C, FIG. 4D, FIG. 4E, FIG. 4F, as noted by log file identifier at 410.

FIG. 4F shows an example display of various files that may be generated by MobileKit during performance testing. The generated files hold data that may be helpful in user functional, logical, and performance feature debugging to resolve an application program bug or measure a performance test feature, for example. For example, crash events, if applicable, may be recorded in file "Crashlogs" file. Media data, recorded during testing, may be recorded in the "video.mp4" file and performance test results may be recorded in the "syslog.txt" file, shown at 412. "Syslog.txt" may include startup time measurement data recorded during performance testing of the APUT but "syslog.txt" remains invisible and inaccessible to client device 102 given restricted access by an access control file or by other blocking mechanisms. In an embodiment, client device 102 is configured or programmed to unlock access to "syslog.txt" through execution of a series of steps.

In an example embodiment, "video.mp4" file may be stored in video storage location 118-N (FIG. 1), "syslog.txt" may be stored in result storage location 118-1, and "crashlogs" file may be stored in program log storage location 118-2.

The display of FIG. 4F shows directions to locating the "syslog.txt" and contents within. But client device 102 has restricted access to "syslog.txt" and its contents, e.g. measured startup time data, are unavailable and inaccessible to client device 102 at this point. Client device 102 must unlock the log file prior to retrieving startup time data. In an example embodiment, client device 102 may perform parsing of test output data to retrieve a log file identifier, as discussed with reference to FIG. 2. For example, client device 102 may read and search the display data of FIG. 4E to identify the "syslog.txt" unique file name indicator. Alternatively, client device 102 may be configured or program to perform parsing to identify the log file identifier on a corresponding access control program. In an embodiment, the access control program may be a part of the performance test program or the APUT test program that is uploaded by client device 102. In an embodiment, access control data is generated by performance test system 130.

In either parsing method, in accordance with an embodiment, client device 102 searches for an identifier text string uniquely identifying the log file. For example, the text string may be notoriously long and/or made of notoriously random text strings for emphasis. In an embodiment, log file identifier need not be a text string. For example, log file identifier may be a character string or another type of identification indicator altogether.

Figure 5A:
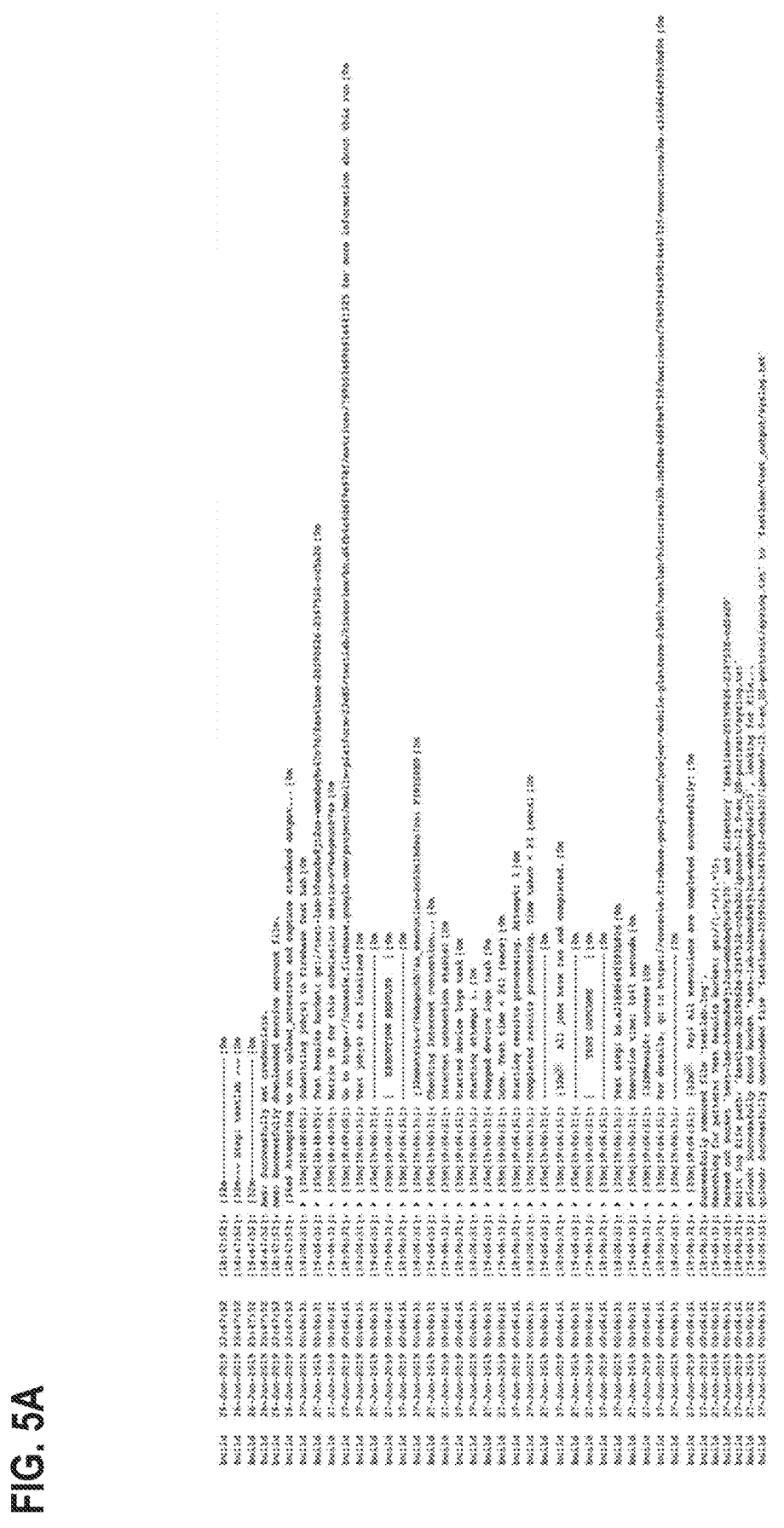

FIG. 5A shows an example display of output data generated by a Google data center test device based on performance of an iterative performance test on an APUT. FIG. 5A output data is generated from 25 performance test runs conducted by a single test device while executing APUT performance test program. Iteration "0" is an installation, not a startup, time. For this reason, iteration "0" took approximately 8×, 41.82 seconds, to execute relative to the iteration execution times of the remaining 24 iterations, which are mostly in the range of 5 seconds. Each iteration data represents a corresponding application program startup time data. As shown, most iterations executed in the approximate 5 seconds but one of the iterations executed irregularly relative to most others. The iteration shown executed at time 12:31:27 on July 16th, took approximately 4 seconds to execute—it is a one-off. In an embodiment, the one-off outcome is presumed caused by an unexpected or unusual environmental, functional or logical occurrence, for example a brief test interruption. Anomaly outcomes, if processed with remaining outcomes, can have the effect of falsely biasing the performance results. For this reason, in the example of FIG. 5A, the iteration at time 12:31 27 may be discounted and removed from further processing. In an embodiment, it remains part of the performance data to be processed. In an embodiment, average, standard deviation and error data may be calculated for aggregated heuristics performance data with finer granularity that also contributes to optimizing the accuracy and reliability of the performance data.

Figure 5B:
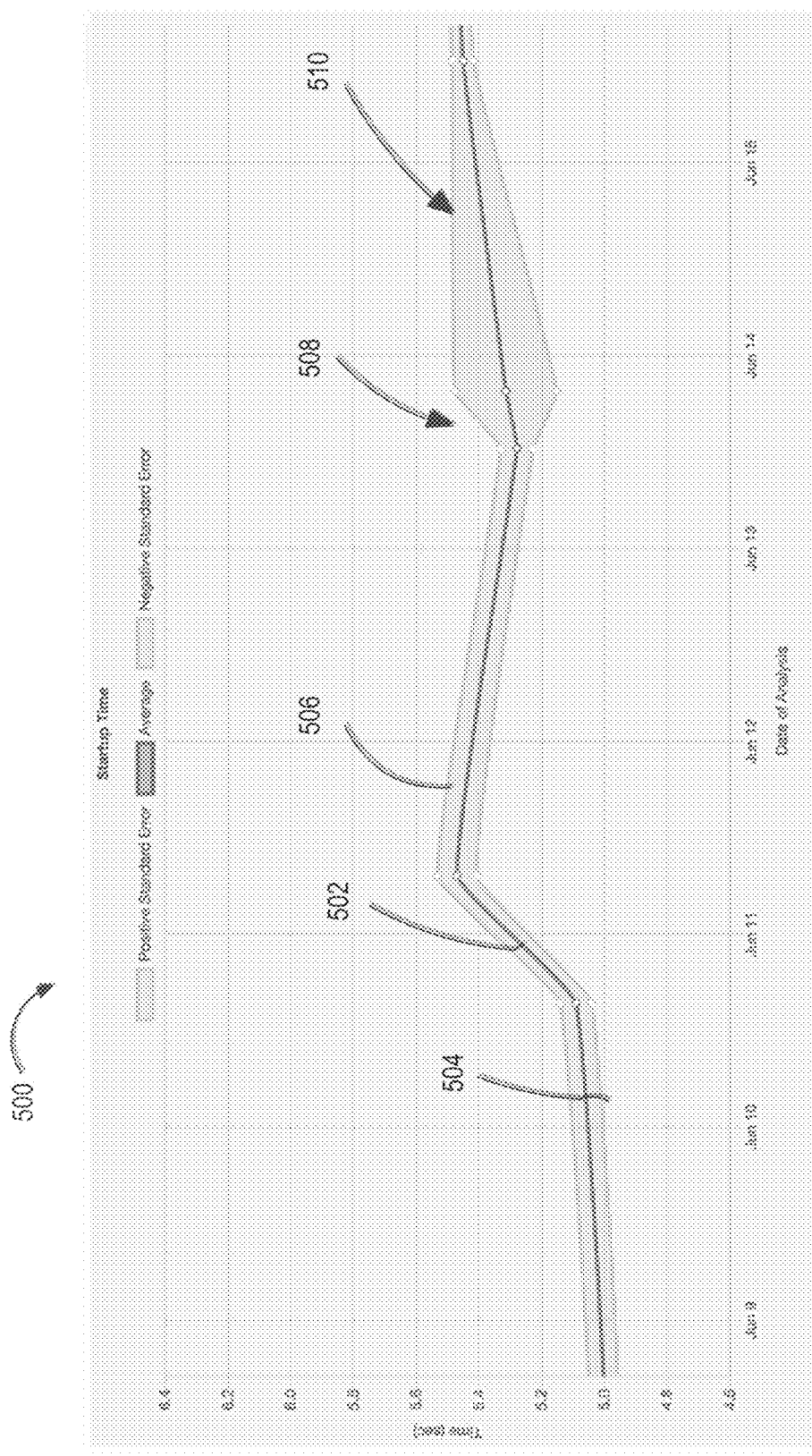
FIG. 5B shows graph data of processed performance test results.

FIG. 5B shows example graph data of processed performance test results. FIG. 5A and FIG. 5B test results and data are separately generated. Example performance graph data 500 describes APUT startup time performance behavior for an approximate two week time line. Graph 500 shows data points at 512, representative of recorded performance measurements at corresponding times. Graph 502 shows average startup time based on performance test measurements denoted at data points 512. Graphs 506 and 504 show positive and negative standard deviation errors, respectively. Average startup time measurements are between 5 seconds to 5.5 seconds, during the time period between June 9 and June 13. Graphs 506 and 504 generally track graph 502 during this time period with no visibly apparent anomalies. But test results change significantly from the time period referenced at 508 and on, particular the time period between 508 and 510 when standard deviation errors increase considerably relative to average startup times. For example, on June 14, at 508, the difference between average startup times and standard deviation errors are nearly two times that of prior time periods. In an example embodiment, the data points between 508 to 510 are disqualify candidates from further processing.

In an embodiment, the client device is configured to remove any measured performance test metric of a performance test iteration with a standard deviation value that is higher than a tolerance level value. In another embodiment, the tolerance level value is set higher than an average standard deviation value that is based on an average of the measured performance test metric of all or some of the performance test iterations. In still another embodiment, for each performance test iteration, the client device is configured to cause restarting the performance test prior to starting a next performance test iteration.

6.0 Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 6:
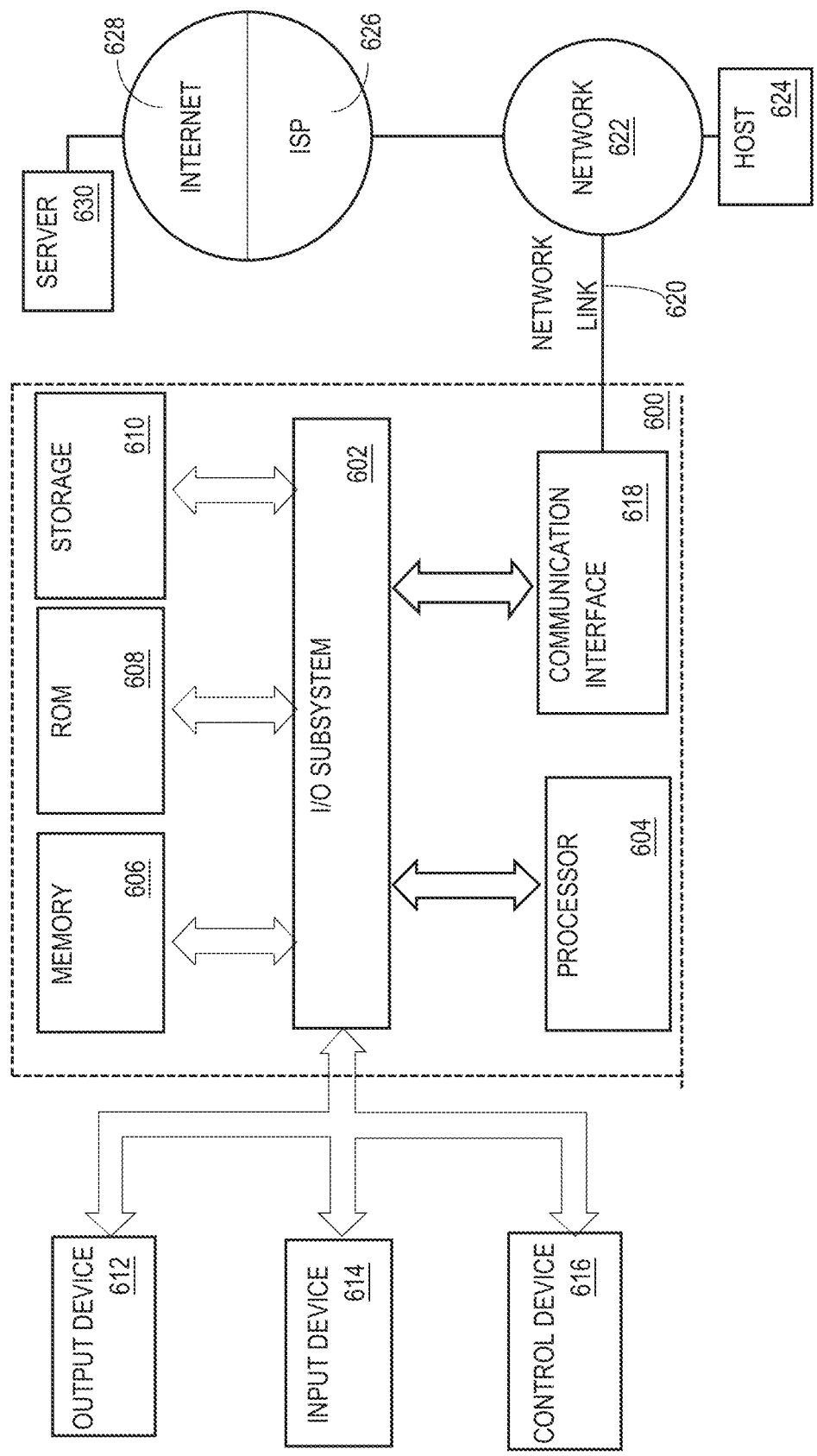
FIG. 6 is a block diagram that illustrates an example computer system with which an embodiment may be implemented.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 may include, for example, a general-purpose microprocessor or microcontroller and/or a special-purpose microprocessor such as an embedded system or a graphics processing unit (GPU) or a digital signal processor or ARM processor. Processor 604 may comprise an integrated arithmetic logic unit (ALU) or may be coupled to a separate ALU.

Computer system 600 includes one or more units of memory 606, such as a main memory, which is coupled to I/O subsystem 602 for electronically digitally storing data and instructions to be executed by processor 304. Memory 306 may include volatile memory such as various forms of random-access memory (RAM) or other dynamic storage device. Memory 606 also may be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 308 or other static storage device coupled to I/O subsystem 602 for storing information and instructions for processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM, and may be coupled to I/O subsystem 602 for storing information and instructions. Storage 610 is an example of a non-transitory computer-readable medium that may be used to store instructions and data and when the instructions are executed by the processor 604, they cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 600 may be coupled via I/O subsystem 602 to at least one output device 312. In one embodiment, output device 612 is a digital computer display. Examples of a display that may be used in various embodiments include a touch screen display or a light-emitting diode (LED) display or a liquid crystal display (LCD) or an e-paper display. Computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. Control device 616 may be a touchpad, a mouse, a trackball, or cursor direction keys for communicating direction information and command selections to processor 604 and for controlling cursor movement on display 612. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When computer system 600 is a mobile computing device, input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 630.

Computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions may be read into main memory 606 from another storage medium, such as storage 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media may be involved in carrying at least one sequence of at least one instruction to processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to a format that can be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 may optionally be stored on storage 610 either before or after execution by processor 604.

Computer system 600 also includes a communication interface 618 coupled to bus 302. Communication interface 618 provides a two-way data communication coupling to network link(s) 620 that are directly or indirectly connected to at least one communication networks, such as a network 622 or a public or private cloud on the Internet. For example, communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a local area network (LAN), wide-area network (WAN), campus network, internetwork or any combination thereof. Communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 622 to a host computer 624.

Furthermore, network link 620 may provide a connection through network 622 or to other computing devices via internetworking devices and/or computers that are operated by an Internet Service Provider (ISP) 626. ISP 626 provides data communication services through a world-wide packet data communication network represented as internet 628. A server computer 630 may be coupled to internet 628. Server 630 broadly represents any computer, data center, virtual machine or virtual computing instance with or without a hypervisor, or computer executing a containerized program system such as DOCKER or KUBERNETES. Server 630 may represent an electronic digital service that is implemented using more than one computer or instance and that is accessed and used by transmitting web services requests, uniform resource locator (URL) strings with parameters in HTTP payloads, API calls, app services calls, or other service calls. Computer system 600 and server 630 may form elements of a distributed computing system that includes other computers, a processing cluster, server farm or other organization of computers that cooperate to perform tasks or execute applications or services. Server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 630 may comprise a web application server that hosts a presentation layer, application layer and data storage layer such as a relational database system using structured query language (SQL) or no SQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 604. While each processor 604 or core of the processor executes a single task at a time, computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
   initiating a performance test using a client device that is coupled via one or more internetworks to a performance test system comprising a plurality of different test devices, the performance test system comprising an access control program that limits access to certain performance data that is automatically generated by at least one test device of the plurality of different test devices during or after the performance test;
   installing program instructions of the performance test with an application program under test (APUT) in the at least one test device of the plurality of different test devices by calling the access control program; and
   performing the performance test on the APUT while the APUT is hosted by the at least one test device by executing the program instructions of the performance test, the performance test of the APUT comprising:
      causing performance of one or more performance test iterations of the performance test by, for each performance test iteration:
         initiating a performance test iteration;
         in response to initiating the performance test iteration, determining a set of performance test results based on an execution of the APUT;
         monitoring the execution of the program instructions on the at least one test device for a first test condition;
         in response to the execution of the program instructions meeting the first test condition, starting a measurement of a performance test metric at a start time;
         monitoring the execution of the program instructions for a second test condition, the first test condition being met before the second test condition is met;
         in response to the execution of the program instructions meeting the second test condition, stopping the measurement of the performance test metric at a stop time; and
         determining a measured performance test metric based on a difference between the start time and the stop time; and
      after completing the one or more performance test iterations:
         determining a test result based on the measured performance test metric of at least some of the one or more performance test iterations;
         electronically providing the test result for access by the client device; and
         electronically providing the set of performance test results to the performance test system, the performance test system limiting access to the set of performance test results by the client device.

2. The computer-implemented method of claim 1, further comprising for each performance test iteration, saving the measured performance test metric into a log file.

3. The computer-implemented method of claim 2, further comprising, after each performance test iteration:
   causing saving the measured performance test metric of an immediately preceding performance test iteration onto the log file; and
   displaying the measured performance test metric, the test result, the start time, the stop time, or a combination thereof, of the immediately preceding performance test iteration, to a user interface of the test device.

4. The computer-implemented method of claim 1, further comprising determining the test result by applying a performance test function to the measured performance test metric of at least some of the one or more performance test iterations.

5. The computer-implemented method of claim 4, further comprising executing the performance test function using an arithmetic average, a standard deviation, an error, or a combination thereof.

6. The computer-implemented method of claim 1, further comprising determining that the first test condition is met when the test device executes an initial program instruction of the program instructions and determining that the second test condition is met when the test device initially causes rendering of a user interface of the test device.

7. The computer-implemented method of claim 1, further comprising determining that the first test condition is met in response to determining that the APUT has loaded onto the test device and determining that the second test condition is met in response to determining that the test device has executed an initial program instruction of the program instructions.

8. The computer-implemented method of claim 1, further comprising removing any measured performance test metric of a performance test iteration with a standard deviation value that is higher than a stored tolerance level value.

9. The computer-implemented method of claim 8, wherein removing any measured performance test metric is based on a determination that the stored tolerance level value is higher than an average standard deviation value that is based on an average of all or some of the measured performance test metrics of the performance test iterations.

10. The computer-implemented method of claim 1, further comprising for each performance test iteration, restarting the performance test iteration prior to starting a next performance test iteration.

11. A computer system comprising:
    a processor;
    a communication interface; and
    a non-transitory computer-readable storage medium storing sequences of instructions, which when executed by the processor, cause the processor to implement a method comprising:
       initiating a performance test using a client device that is coupled via one or more internetworks to a performance test system comprising a plurality of different test devices, the performance test system comprising an access control program that limits access to certain performance data that is automatically generated by at least one test device of the plurality of different test devices during or after the tests performance test;
       installing program instructions of the performance test with an application program under test (APUT) in the at least one test device of the plurality of different test devices by calling the access control program; and performing the performance test on the APUT while the APUT is hosted by the at least one test device by executing the program instructions of the performance test, the performance test of the APUT comprising:

causing performance of one or more performance test iterations of the performance test by, for each performance test iteration:

initiating a performance test iteration;

in response to initiating the performance test iteration, determining a set of performance test results based on an execution of the APUT;

monitoring the execution of the program instructions on the at least one test device for a first test condition;

in response to the execution of the program instructions meeting the first test condition, starting a measurement of a performance test metric at a start time;

monitoring the execution of the program instructions for a second test condition, the first test condition being met before the second test condition is met;

in response to the execution of the program instructions meeting the second test condition, stopping the measurement of the performance test metric at a stop time; and determining a measured performance test metric based on a difference between the start time and the stop time; and after completing the one or more performance test iterations:

determining a test result based on the measured performance test metric of at least some of the one or more performance test iterations;

electronically providing the test result for access by a client device; and electronically providing the set of performance test results to the performance test system, the performance test system limiting access to the set of performance test results by the client device.

12. The computer system of claim 11, wherein the client device is configured to determine the test result by applying a performance test function to the measured performance test metric of at least some of the one or more performance test iterations.

13. The computer system of claim 11, wherein the client device is configured to determine that the first test condition is met when the test device executes an initial program instruction of the program instructions and further configured to determine that the second test condition is met when the test device initially causes rendering of a user interface of the test device.

14. The computer system of claim 13, wherein the client device is configured to execute the performance test function using an arithmetic average, a standard deviation, an error, or a combination thereof.

15. The computer system of claim 11, wherein the client device is configured to determine that the first test condition is met in response to a determination that the APUT has loaded onto the test device and further configured to determine that the second test condition is met in response to a determination that the test device has executed an initial program instruction of the program instructions.

16. The computer system of claim 11, wherein the client device is configured to remove any measured performance test metric of a performance test iteration with a standard deviation value that is higher than a stored tolerance level value.

17. The computer system of claim 16, wherein the stored tolerance level value is higher than an average standard deviation value that is based on an average of the measured performance test metric of all or some of the performance test iterations.

18. The computer system of claim 11, wherein for each performance test iteration, the client device is configured to cause restarting the performance test iteration prior to starting a next performance test iteration.

\* \* \* \* \*